(12) United States Patent
Carmel et al.

(10) Patent No.: US 7,072,827 B1
(45) Date of Patent: Jul. 4, 2006

(54) MORPHOLOGICAL DISAMBIGUATION

(75) Inventors: David Carmel, Haifa (IL); Yoelle Maarek-Smadja, Haifa (IL); Victoria Skoblikov, Campbell, CA (US)

(73) Assignee: International Business Machines Corporation, Armonk, NY (US)

( * ) Notice: Subject to any disclaimer, the term of this patent is extended or adjusted under 35 U.S.C. 154(b) by 743 days.

(21) Appl. No.: 09/606,326

(22) Filed: Jun. 29, 2000

(51) Int. Cl.
*G06F 17/27* (2006.01)

(52) U.S. Cl. .................................. 704/9; 704/10; 704/1
(58) Field of Classification Search .................... 704/9, 704/260, 1; 395/200.36; 382/36
See application file for complete search history.

(56) References Cited

U.S. PATENT DOCUMENTS

| | | | | |
|---|---|---|---|---|
| 4,862,408 | A * | 8/1989 | Zamora | 707/102 |
| 5,559,693 | A * | 9/1996 | Anick et al. | 704/9 |
| 5,794,177 | A * | 8/1998 | Carus et al. | 704/9 |
| 5,835,888 | A * | 11/1998 | Kanevsky et al. | 704/9 |
| 5,963,893 | A * | 10/1999 | Halstead et al. | 704/9 |
| 6,101,492 | A * | 8/2000 | Jacquemin et al. | 707/3 |
| 6,393,389 | B1 * | 5/2002 | Chanod et al. | 704/7 |
| 6,415,250 | B1 * | 7/2002 | van den Akker | 704/9 |

OTHER PUBLICATIONS

Oflazer et al., Morphological Disambiguation by Voting Constraints, 1997, ACL, p. 222-229.*
Ezeiza et al., Combining Stochastic and Rule-Based Methods for Disambiguation in Agglutinative Languages, 1998, ACL, p. 380-384.*
Maarek et al., "An Information Retrieval Approach for Automatically Constructing Software Libraries", in IEEE Transactions on Software Engineering 17(8), pp. 800-813, (Aug. 1991).
Levinger et al., "Learning Morpho-Lexical Probabilities from an Untagged Corpus with an Application to Hebrew", Published in Computational Linguistics 2(3), pp. 383-404, (1993).

* cited by examiner

*Primary Examiner*—Richemond Dorvil
*Assistant Examiner*—Lamont Spooner
(74) *Attorney, Agent, or Firm*—Darby & Darby

(57) ABSTRACT

A method for morphological disambiguation includes receiving an input string and morphologically analyzing the string to generate a list of candidate analyses of the string, each candidate analysis including a respective word and a linguistic pattern of the word. The pattern of each of the analyses is evaluated against a predefined criterion in order to select one or more of the analyses from the list. The method is suitable particularly for computerized analysis and searching in Hebrew and other Semitic languages.

28 Claims, 5 Drawing Sheets

MORPHOLOGICAL DISAMBIGUATION

FIELD OF THE INVENTION

The present invention relates generally to computer-based linguistic processing and specifically to methods for resolving which of a number of meanings of a given word in a text is likely to be the correct one, particularly in morphologically-rich languages such as Hebrew.

BACKGROUND OF THE INVENTION

With the explosive growth in the volume of available on-line information, the efficiency of information retrieval (IR) systems becomes increasingly important. IR systems generally operate on a canonical representation of documents, called a "profile," consisting of a list of indexing units. For text searching, the indexing units are typically words. The profiles are stored in an inverted index, enabling documents to be retrieved by matching the terms in a query phrase to the words in the index. Many IR applications have been developed. One example is the GURU system described by Maarek et al., in an article entitled "An Information Retrieval Approach for Automatically Constructing Software Libraries," in *IEEE Transactions on Software Engineering* 17(8), pages 800–813 (August, 1991), which is incorporated herein by reference.

For efficient and thorough searching, it is desirable that variants of a given word, such as singular and plural forms of a noun, or different tenses of a verb, be mapped to the same indexing unit. In other words, a lexical analysis of the words should be invoked so that, ideally, all of them are represented by the same base word. The simplest tool for lexical analysis is a stemmer, which derives base words using ad hoc rules for stripping suffices and handling exceptional word forms. A more precise method is morphological analysis, using a dictionary and a set of declination rules to find the lexical base forms of the words in the document. The base form of a given word is referred to as its "lemma."

English language morphology is simple enough so that even stemmers do an adequate job of analysis for most applications. Hebrew, however, like other Semitic languages, is highly synthetic and rich in variants. In standard Hebrew writing, not all of the vowels are represented, while several letters may represent either a vowel or a consonant. A given lexical root may be declined by insertion, deletion, substitution or affixation of letters. It is often difficult to determine which letters in a word belong to the lemma, and which have been added. For example, the Hebrew word mishtara can be analyzed correctly as any of:

Mishtara (police)

Mishtar+a (her regime)

Mi+shtar+a (from her bill)

The result of this complex morphology is a high level of ambiguity, which cannot be resolved unequivocally without contextual information. Therefore, Hebrew morphological analyzers typically return multiple possible analyses for a given word. An example of a morphological analyzer with Hebrew capabilities is the POE LanguageWare system (version 2.6), offered by the IBM Software Solutions Division, of Research Triangle Park, N.C. For each legal Hebrew input string, this analyzer returns all legal lexical candidates as possible analyses of the given string, along with the following characteristics of each candidate:

Lemma—the base form used for indexing.

Category—categorization of the lemma according to part of speech, gender, plural inflections, legal set of prefixes and legal set of suffixes.

Part of speech.

Prefix—attached particles.

Correct form—(optional) the input word with additional vowel letters added to enable the given analysis.

Number, gender, person.

Status—(for non-verbs only)—whether this lemma is in a construct (nismach) or in its absolute (nifrad) form.

Tense—(for verbs only)

Conjugation pattern (binyan and gizra—for verbs only).

Inf_num, inf_gen, inf_person—number, gender and person of pronominal suffix, added to Hebrew words to indicate possessives or verb objects, for example.

On average, this analyzer returns 2.15 analysis for each input string.

A number of methods have been proposed for resolving the ambiguity of Hebrew morphological analysis. Most methods use contextual information. Levinger et al. describe a context-free method in an article entitled "Learning Morpho-Lexical Probabilities from an Untagged Corpus with an Application to Hebrew," published in *Computational Linguistics* 2(3), pages 383–404 (1993), which is incorporated herein by reference. In studying a large Hebrew text base, the authors found that 55% of the words had more than one morphological reading, and 33% had more than two. They describe a method of disambiguation based on gathering statistics on the text base, so as to determine, for each word, a morpho-lexical probability for each of its alternative analyses, indicating the likelihood that the analysis is correct. An analysis of a given word that has a significantly higher probability than the alternatives is taken to be the correct one, regardless of the context and the form of the word.

SUMMARY OF THE INVENTION

In preferred embodiments of the present invention, a Hebrew morphological disambiguator receives the output of a morphological analyzer and prunes the number of candidate analyses for each word. The pruning is based on the morphological patterns of the different analyses, rather than on the words themselves as in the above-mentioned system described by Levinger et al. The "pattern" of a word, in this context, consists of a certain combination of linguistic characteristics, which are typically provided by the morphological analyzer. Preferably, these characteristics include the part of speech, prefix, number, gender, person and, in the case of verbs, the tense and conjugation model. Statistical data from a large corpus of text are used to determine a frequency of occurrence of each possible pattern, independent of the base words, or lemmas, to which the pattern is applied. The disambiguator prunes out those candidates whose pattern occurs with low frequency.

Pattern-based disambiguation is advantageous, by comparison with word-based schemes, because there are far fewer possible patterns than there are words. As a result, pattern statistics are more stable and reliable and easier to handle than word statistics. For example, in a corpus of 10 million Hebrew words studied by the inventors, only 2,300 different patterns were found, as opposed to 25,000 unique words. The methods provided by preferred embodiments of the present invention thus enables context-free disambiguation of text with improved efficiency and confidence by comparison with methods known in the art. Alternatively or additionally, the principles of the present invention may be implemented in conjunction with context-dependent disambiguation schemes.

In some preferred embodiments of the present invention, the disambiguator is used as part of a system for searching a corpus of text documents, such as the above-mentioned GURU system. Preferably, the disambiguator is used to prune the number of analyses of the words in the documents that are included in a search index of the corpus. It is then used again to analyze the words in a user query, so as to determine the lemmas to search for in the index.

Alternatively, the present invention may be used in other linguistic processing applications, such as computerized natural language processing and speech analysis, as well as spell-checking. Dealing with Hebrew spelling is a particularly difficult problem, since almost any string can be interpreted as a legal word. In a preferred embodiment of the present invention, a spell-checking program uses pattern-based morphological analysis, as described herein, to identify strings having rare morphological patterns as potential misspellings.

While preferred embodiments are described herein with reference to the Hebrew language, the principles of morphological disambiguation described herein are also applicable to other morphologically-rich languages, including particularly other Semitic languages, such as Arabic.

There is therefore provided, in accordance with a preferred embodiment of the present invention, a method for morphological disambiguation, including:

receiving an input string;

morphologically analyzing the string to generate a list of candidate analyses of the string, each candidate analysis including a respective word and a linguistic pattern of the word; and evaluating the pattern of each of the analyses against a predefined criterion in order to select one or more of the analyses from the list.

Preferably, receiving the input string includes receiving a word in a Semitic language, most preferably in Hebrew.

Further preferably, the linguistic pattern includes a specification of at least one characteristic of the word, selected from a set of characteristics including a part of speech, prefix, number, gender and person of the word. Most preferably, the specification of the at least one characteristic includes a specification of all of the characteristics in the set. Additionally or alternatively, when the base word includes a verb, the linguistic pattern further includes a designation of a tense and conjugation pattern of the verb.

In a preferred embodiment, each of the analyses has a lemma and a paradigm determined by the word and the linguistic pattern thereof, and evaluating the pattern includes eliminating one of the analyses from the list if it has the same lemma and paradigm as another of the analyses.

Preferably, evaluating the pattern includes determining a relative frequency of occurrence of the pattern of each of the analyses, and selecting the at least one of the analyses whose frequency of occurrence is above a predetermined threshold. Most preferably, determining the relative frequency of occurrence includes morphologically analyzing a corpus of text and finding the frequency of occurrence of the pattern in the corpus, wherein determining the relative frequency of occurrence includes storing in a table the frequency of occurrence found in the corpus, and looking up the pattern in the table. Additionally or alternatively, selecting the at least one of the analyses includes setting the threshold so as to control how many of the analyses from the list are selected. Further additionally or alternatively, selecting the at least one of the analyses includes selecting the at least one of the analyses based on the pattern thereof, and substantially independently of the respective word.

In a preferred embodiment, the method includes searching in a corpus of text for a match to the input string using the one or more selected analyses. In another preferred embodiment, the method includes checking a document for spelling errors using the one or more selected analyses.

There is also provided, in accordance with a preferred embodiment of the present invention, a method for searching a corpus of text made up of words, including:

morphologically analyzing the words in the corpus to generate, for each of at least some of the words, a list of candidate analyses, each candidate analysis including a respective lemma and a linguistic pattern relating the lemma to the analyzed word;

evaluating the pattern of each of the analyses against a predefined criterion in order to select one or more of the analyses from the list for each of the analyzed words;

entering the lemmas of the selected analyses in an index of the corpus; and applying a search query to the index.

Preferably, applying the search query includes:

receiving an input text string;

morphologically analyzing and disambiguating the string to generate one or more search lemmas for the string; and comparing the search lemmas to the index.

There is further provided, in accordance with a preferred embodiment of the present invention, a computer software product, including a computer-readable medium in which program instructions are stored, which instructions, when read by a computer, cause the computer to morphologically analyze an input string to generate a list of candidate analyses of the string, each candidate analysis including a respective word and a linguistic pattern of the word, and to evaluate the pattern of each of the analyses against a predefined criterion in order to select one or more of the analyses from the list.

There is additionally provided, in accordance with a preferred embodiment of the present invention, a computer software product, including a computer-readable medium in which program instructions are stored, which instructions, when read by a computer, cause the computer to morphologically analyze the words in the corpus to generate, for each of at least some of the words, a list of candidate analyses, each candidate analysis including a respective lemma and a linguistic pattern relating the lemma to the analyzed word, to evaluate the pattern of each of the analyses against a predefined criterion in order to select one or more of the analyses from the list for each of the analyzed words, to enter the lemmas of the selected analyses in an index of the corpus, and to apply a search query to the index.

There is furthermore provided, in accordance with a preferred embodiment of the present invention, apparatus for morphological disambiguation, including a linguistic processor, which is adapted to receive an input string, to morphologically analyze the string to generate a list of candidate analyses of the string, each candidate analysis including a respective word and a linguistic pattern of the word, and to evaluate the pattern of each of the analyses against a predefined criterion in order to select one or more of the analyses from the list.

There is moreover provided, in accordance with a preferred embodiment of the present invention, apparatus for searching a corpus of text made up of words, including a linguistic processor, which is adapted to morphologically analyze the words in the corpus to generate, for each of at least some of the words, a list of candidate analyses, each candidate analysis including a respective lemma and a linguistic pattern relating the lemma to the analyzed word, to evaluate the pattern of each of the analyses against a predefined criterion in order to select one or more of the analyses from the list for each of the analyzed words, to enter the lemmas of the selected analyses in an index of the corpus, and to apply a search query to the index.

The present invention will be more fully understood from the following detailed description of the preferred embodiments thereof, taken together with the drawings in which:

DETAILED DESCRIPTION OF PREFERRED EMBODIMENTS

Figure 1:
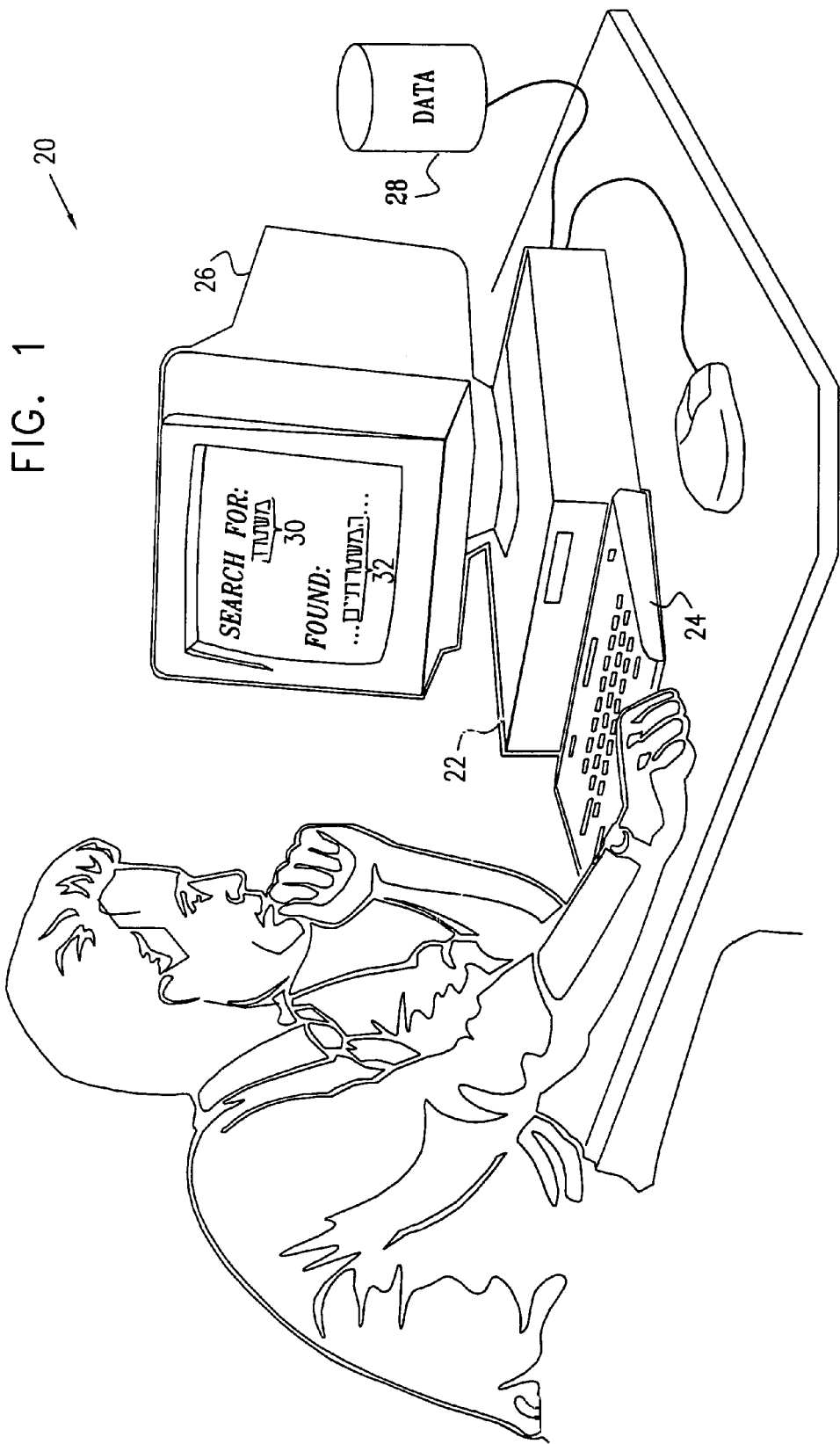
FIG. 1 is a schematic, pictorial illustration of a system for linguistic analysis with morphological disambiguation, in accordance with a preferred embodiment of the present invention.

FIG. 1 is a schematic, pictorial illustration of a system 20 for linguistic processing, in accordance with a preferred embodiment of the present invention. System 20 comprises a computer processor 22, with a text input device, such as a keyboard 24, and an output device, such as a display 26. Alternatively or additionally, the processor may receive its input and/or output via a network or by any other suitable means. System 20 typically performs its functions, described in detail hereinbelow, under the control of software running on processor 22. This software may be downloaded to the processor over a network or, alternatively, it may be provided on tangible means, such as CD-ROM or non-volatile memory.

In typical operation, system 20 operates on a corpus of text documents, which are stored in one or more storage devices 28, either local to processor 22 or accessed via a network. System 20 processes the documents to determine the lemmas of the words in the text and, preferably, to build an index to the corpus based on these lemmas. A user of system 20 inputs a search string 30, such as the Hebrew word "mishtara," mentioned in the Background of the Invention. The system finds the lemma (or multiple candidate lemmas) of the search string and uses it to retrieve matching documents from the corpus, based on the index. One such match 32, "hamishtartiyim" (a plural, adjectival form of "police," prefixed by the definite article) is shown on display 26 by way of example. While string matching and other naive algorithms would fail to find this match, morphological processing based on the methods described herein enables matches like this one to be found with good precision.

Figure 2:
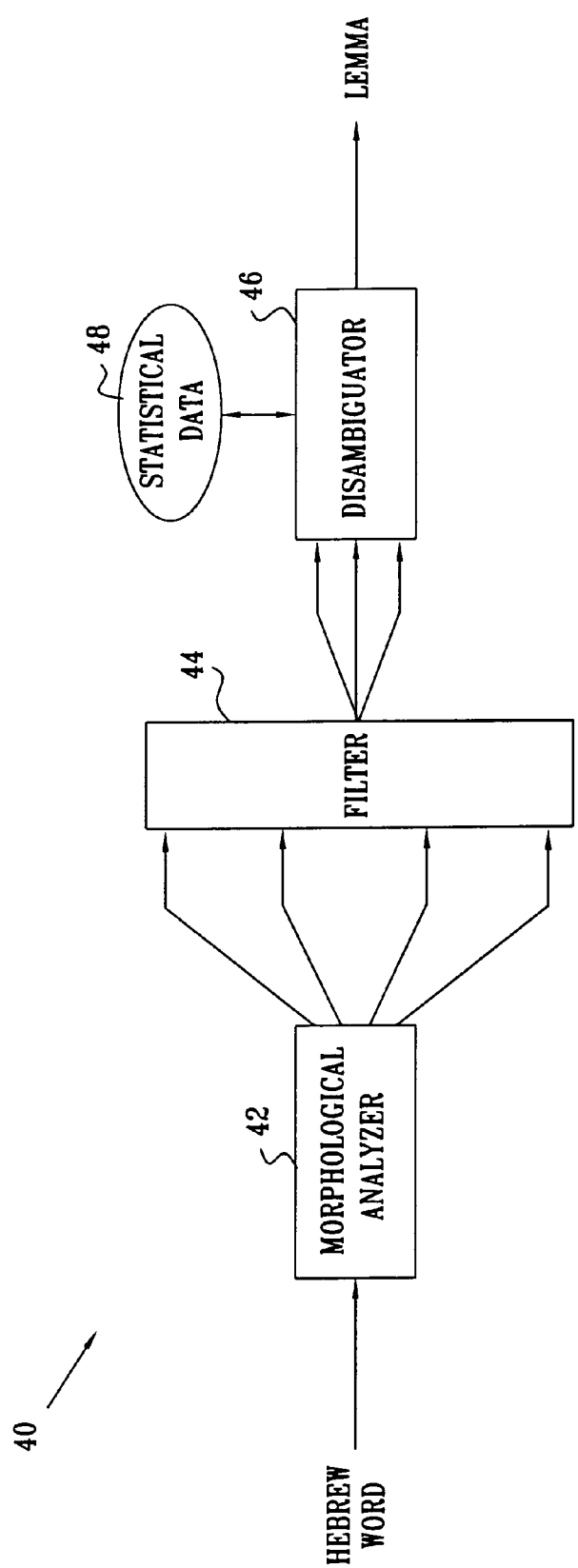
FIG. 2 is a block diagram showing functional details of the system of FIG. 1, in accordance with a preferred embodiment of the present invention.

FIG. 2 is a block diagram that schematically illustrates a set 40 of functional blocks used in processing performed by system 20, in accordance with a preferred embodiment of the present invention. In practice, the functions of all of these blocks are preferably carried out by the software running on processor 22, although some of the processing functions may also be performed by a remote server, for example. Each Hebrew word to be processed is input to a morphological analyzer 42. Preferably, analyzer 42 comprises the POE system mentioned in the Background of the Invention, although substantially any Hebrew language morphological analyzer known in the art may be used. For each input word, analyzer 42 typically generates multiple candidate analyses, each comprising a lemma and linguistic characteristics relating the lemma to the input word, as described above.

The output of analyzer 42 is processed by a filter 44, in order to remove variant analyses that are not considered relevant for the purpose of indexing. Preferably, the filter removes corrected forms of words, i.e., analyses that the morphological analyzer has inferred by adding optional vowel letters that are absent in the original input string. This rule is motivated by the assumption that generally only the original string is a candidate to be indexed (or to be searched).

Additionally or alternatively, the filter eliminates multiple analyses having the same lemma and paradigm, leaving only one representative base form for each such set. The "paradigm" of a word in this context is preferably taken to be its part of speech (noun, verb, etc.), with the addition of its conjugation pattern (binyan) in the case of verbs. The reason for this rule is that different inflections of the same lemma do not add information that should be stored in the index. For example, the words inyani (my interest), inyanay (my interests) and inyanei (the interests of) are all constructs of the same lemma and paradigm: inyan—interest (noun). These three variants are typically spelled identically in Hebrew. Filter 42 removes two of the variants.

The application of these two filtering rules together was found to reduce the average number of analyses per word from 2.15 to 1.91. Alternatively, other filtering algorithms, or no filtering, may be used.

The filtered list of analyses is input to a statistical disambiguator 46. The disambiguator decides which of the candidate analyses are likely to be correct based on a statistical base 48 of morphological patterns. The morphological pattern of a given analysis is preferably defined as a tuple of the values of the following characteristics:

TABLE I

PATTERN CHARACTERISTICS

| Field | Number | Values |
|---|---|---|
| Part of speech | 12 | Noun, verb, adjective, number, pronoun, preposition, conjunction, interrogative, particle, adverb, abbreviation, proper name |
| Prefix | 8 | Letters mem, shin, heh, vav, kaf, lamed, bet, or none. (For combination prefixes, only the last letter before the lemma is used.) |
| Number | 2 | Singular, plural |
| Gender | 3 | Masculine, feminine, or both |
| Person | 4 | First, second, third or all |
| Tense | 5 | Past, present, future, imperative, infinitive |

TABLE I-continued

PATTERN CHARACTERISTICS

| Field | Number | Values |
|---|---|---|
| Conjugation | 7 | Paal, nifal, piel, pual, hifil, hufal, hitpael (standard Hebrew conjugation patterns) |
| Status | 2 | Construct, absolute |
| Pronoun suffix | 11 | Legal combinations of inf_num, inf_gen, inf_person for constructs; null for absolute forms. |

Tense and conjugation apply only to verbs, while status applies only to non-verbs. This combination of characteristics was found to be convenient and useful in analyzing Hebrew morphology. It will be understood, however, that other combinations and sub-combinations of characteristics may also be used, including properties not listed in the table above. Those skilled in the art will recognize appropriate characteristics to use in defining morphological patterns for languages other than Hebrew.

Figure 3:
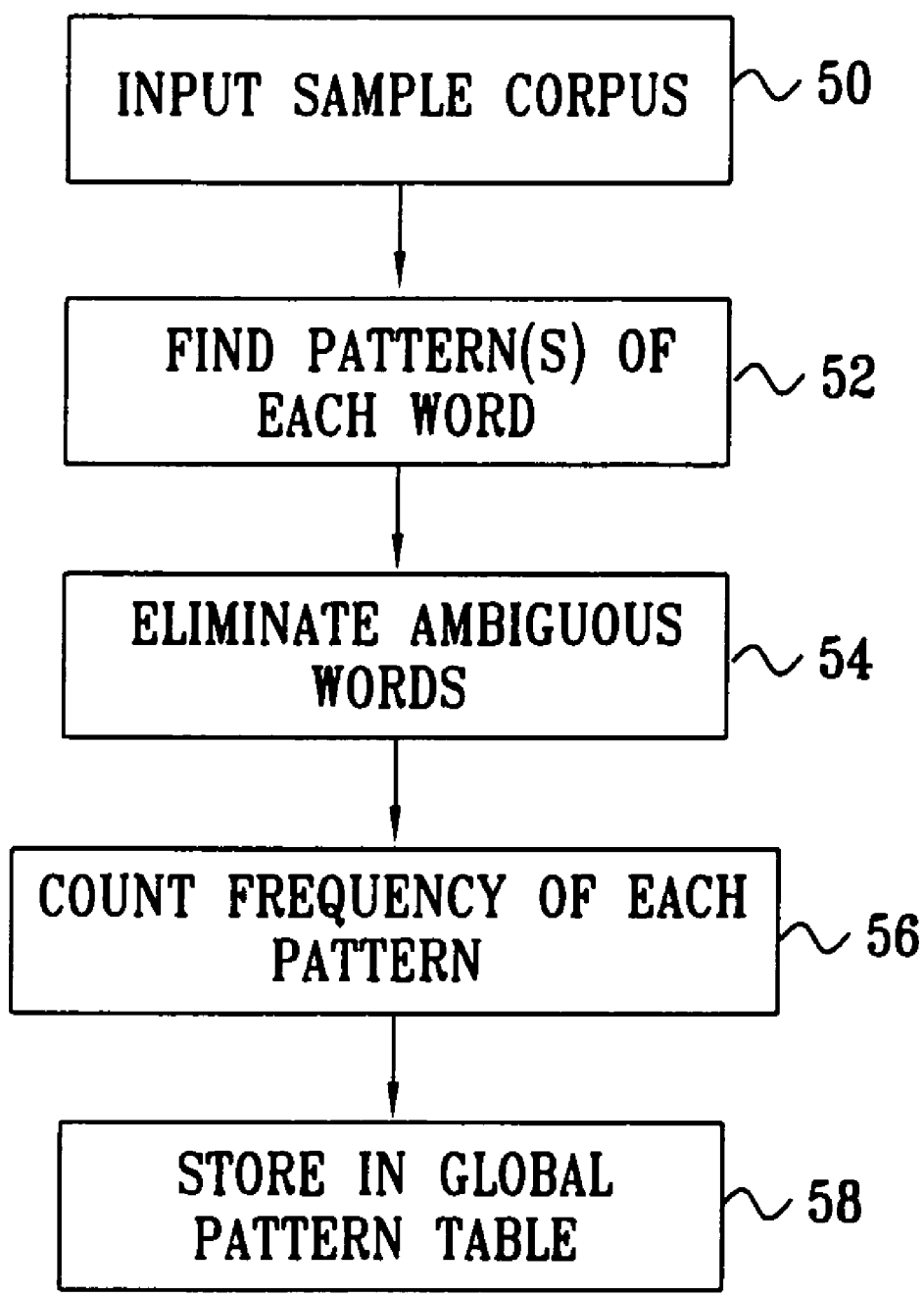
FIG. 3 is a flow chart that schematically illustrates a method for gathering pattern statistics, in accordance with a preferred embodiment of the present invention.

FIG. 3 is a flow chart that schematically illustrates a method for building statistical base 48, in accordance with a preferred embodiment of the present invention. This method generates, for each pattern tuple, a frequency of occurrence that indicates, for the purposes of disambiguator 46, a likelihood that an analysis having this pattern is the correct one. The frequency is independent of the lemma to which the pattern is applied. At a corpus input step 50, a sample corpus of text is received for processing. Analyzer 42 is used to find pattern tuples of the words in the sample, at a pattern finding step 52. The inventors used a corpus of 10 million Hebrew words, among which the analyzer found 2,300 different patterns (as opposed to 25,000 different lemmas).

In order to generate frequency statistics, ambiguous words, for which the analyzer returned multiple analyses, are preferably removed from the sample, at an ambiguity elimination step 54. This step reduced the initial 10 million words in the inventors' corpus to about 4.5 million words. At a counting step 56, a counter is incremented for each instance of each legal pattern that is encountered among the remaining, unambiguous words. The final count values are preferably hashed, for efficient retrieval, and are stored in a global pattern table in base 48, at a storage step 58.

Figure 4:
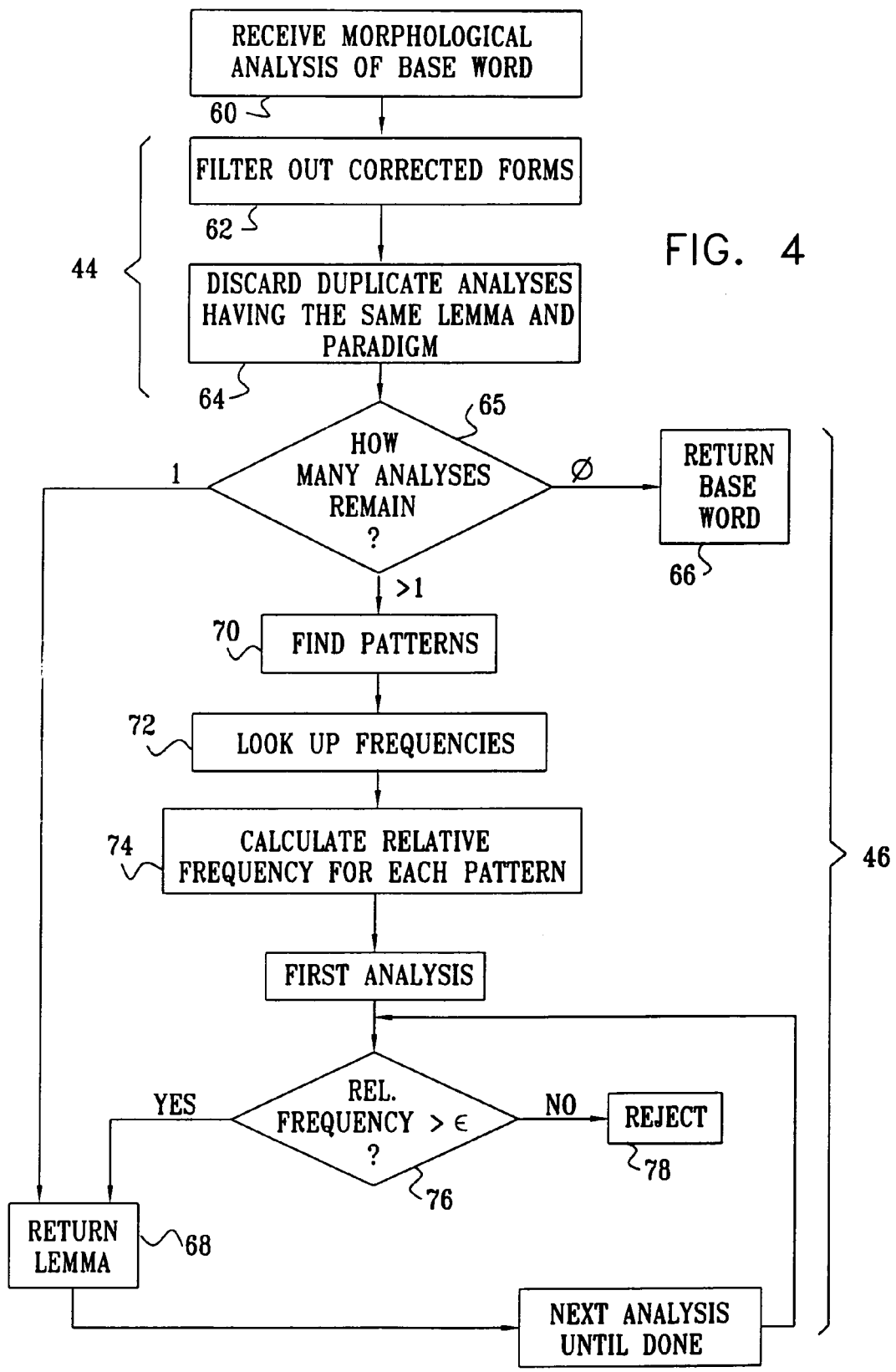
FIG. 4 is a flow chart that schematically illustrates a method for morphological disambiguation, in accordance with a preferred embodiment of the present invention.

FIG. 4 is a flow chart that schematically illustrates a method for analyzing and disambiguating an input word in system 20, in accordance with a preferred embodiment of the present invention. At a morphology step 60, analyzer 42 generates a morphological analysis of the word, typically including multiple candidate analyses. Filter 44 operates on the analyses to remove corrected forms, at a first filtering step 62, and to eliminate duplicate analyses with the same lemma and paradigm, at a second filtering step 64. Steps 60, 62 and 64 were described in detail hereinabove.

At a decision step 65, disambiguator 46 determines how the candidate analyses are to be handled, depending upon the number of analyses delivered by filter 44. If no legal analysis was found by analyzer 42, the disambiguator simply returns the base string that was input to system 20, at a base return step 66. If the filter delivered a single legal analysis, the disambiguator returns the lemma of this analysis, at a lemma return step 68. On the other hand, if multiple candidate analyses were found, the disambiguator finds the pattern tuple for each analysis, at a pattern finding step 70. It looks up the tuples in the pattern table of pattern base 46 to find their respective frequencies, at a lookup step 72. A relative frequency is calculated for each of the candidate patterns, at a relative frequency determination step 74. The relative frequency for each pattern is preferably given by the frequency of that pattern, as listed in the global table, divided by the sum of the frequencies of all of the patterns that were found for the current input word.

At a sorting step 76, the relative frequencies are compared to a threshold parameter $\epsilon$. The choice of the value of $\epsilon$ depends on how drastically the list of candidate analyses is to be pruned. Analyses with relative frequencies below the threshold are rejected, at a rejection step 78. The lemmas of all analyses having frequencies above the threshold are returned at step 68. These lemmas are typically used in building a search index for documents in a corpus or for searching the index thereafter, based on a given query word or words. When multiple lemmas are returned by step 76, their relative frequencies are preferably returned, as well, for use in the search application. Since the relevance score of a document retrieved in a search typically depends on the frequency of occurrence of the query terms inside the document, and some of the terms will have multiple lemmas, the search would be biased in favor of ambiguous terms if all of the lemmas were allowed to contribute equally to the score. Therefore, the relative frequencies of the lemmas are preferably used as a weighting factor in computing the relevance scores.

Figure 5:
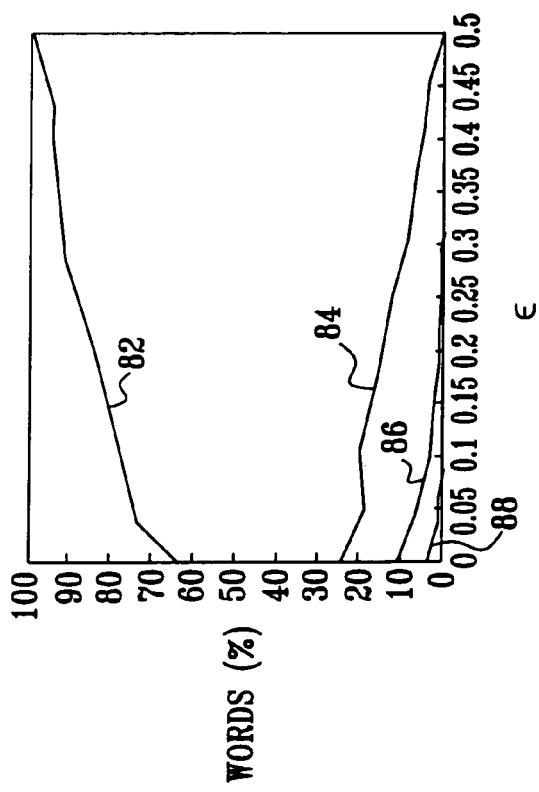

FIG. 5 is a plot showing the number of analyses per word passed by disambiguator 46 as a function of the chosen threshold parameter $\epsilon$, in a sample of 16,000 words tested by the inventors. A curve 82 shows the percentage of words out of the total sample for which the disambiguator returned a single analysis. Curves 84, 86 and 88 show the percentages for returning two, three, or four or more analyses, respectively. At $\epsilon$=0.1, for example, more than 75% of the input words receive only a single analysis, and less than 5% of the words have more than two analyses. For $\epsilon$=0.5, the disambiguator returns only the most likely analysis, and prunes out all of the rest.

Figure 6:
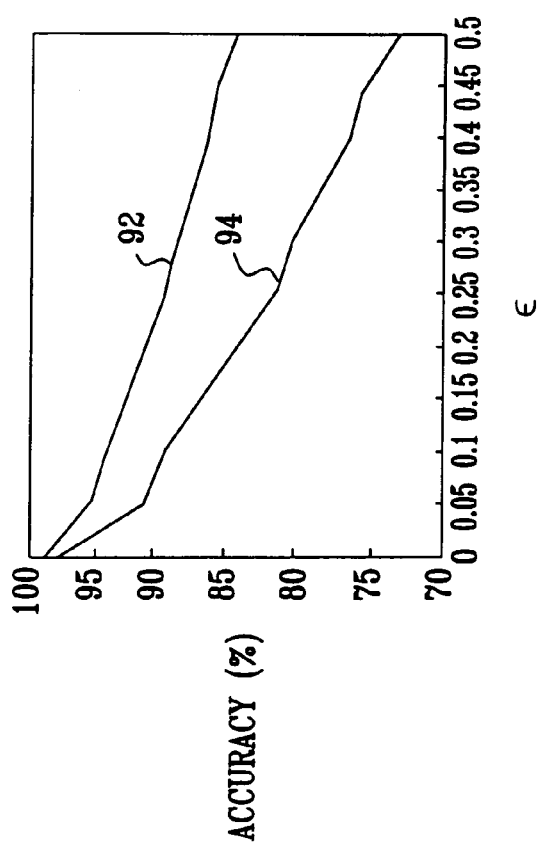
FIGS. 5 and 6 are graphic plots illustrating results obtained from morphological disambiguation of words in a corpus of text using the method of FIG. 4.

FIG. 6 is a plot showing the accuracy of disambiguator 46 in returning the correct analysis of the input words in the sample. "Accuracy" is defined here as the probability that one of the analyses returned by the disambiguator is the "true" analysis, as chosen manually by a human reviewer, without regard to the number of "false" analyses that are returned at the same time. A curve 92 shows the accuracy of disambiguation over the entire sample, while a lower curve 94 shows the accuracy only with respect to ambiguous words (for which analyzer 42 returns two or more analyses). At low thresholds, the disambiguator prunes out relatively few of the analyses, so that the accuracy is close to 100%. (It is not exactly 100%, because filter 44 occasionally removes the correct lemma.) For large values of $\epsilon$, the accuracy drops. It will be observed, however, that for $\epsilon$=0.1, the accuracy of the disambiguator is maintained at 95%, while only one or two analyses are returned for 95% of the words in the sample, as mentioned above.

Thus, by judicious choice of the threshold parameter, a search index can be built and search queries analyzed with enhanced precision, relative to methods know in the art. "Precision" in this context refers to the proportion of relevant items out of the total number of items that are retrieved in the search. The cost of this precision is a reduced level of "recall," meaning that relevant items will sometimes be missed, because the disambiguator has pruned out the "true"

analysis of a term. Therefore, the threshold ϵ is preferably chosen to give an optimal tradeoff between search efficiency and thoroughness.

Alternatively, system 20 and the methods described hereinabove may be integrated in other linguistic processing applications, such as computerized natural language processing. Furthermore, although system 20 is designed to operate on Hebrew language texts, the principles of morphological disambiguation described herein are also applicable to other morphologically-rich languages, including particularly other Semitic languages, such as Arabic.

It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for morphological disambiguation, comprising:
    building a statistical base by morphologically analyzing a corpus of text comprising multiple words having lemmas so as to find respective linguistic patterns of the words independently of the lemmas to which the linguistic patterns are applied, each pattern comprising a specification of at least one characteristic selected from a set of characteristics including a part of speech, prefix, number, gender and person, and finding relative frequencies of occurrence of the linguistic patterns in the corpus;
    receiving an input string;
    morphologically analyzing the string to generate a list of candidate analyses of the string, each candidate analysis comprising a respective word, having a linguistic pattern and a lemma; and
    evaluating the pattern in each of the analyses using the statistical base so as to determine a relative frequency of occurrence of the pattern in each of the analyses, independent of the lemma to which the pattern is applied; and
    selecting from the list one or more of the analyses that comprise respective patterns whose frequency of occurrence is above a predetermined threshold.

2. A method according to claim 1, wherein receiving the input string comprises receiving a word in a Semitic language.

3. A method according to claim 2, wherein the Semitic language comprises Hebrew.

4. A method according to claim 1, wherein the specification of the at least one characteristic comprises a specification of all of the characteristics in the set.

5. A method according to claim 4, wherein when the base word comprises a verb, the linguistic pattern further comprises a designation of a tense and conjugation pattern of the verb.

6. A method according to claim 1, wherein each of the analyses has a lemma and a paradigm determined by the word and the linguistic pattern thereof, and wherein evaluating the pattern comprises eliminating one of the analyses from the list if it has the same lemma and paradigm as another of the analyses.

7. A method according to claim 1, wherein determining the relative frequency of occurrence comprises storing in a table the frequencies of occurrence found in the corpus, and looking up the pattern in the table.

8. A method according to claim 1, wherein selecting the at least one of the analyses comprises setting the threshold so as to control how many of the analyses from the list are selected.

9. A method according to claim 1, wherein selecting the at least one of the analyses comprises selecting the at least one of the analyses based on the pattern thereof, and substantially independently of the respective word.

10. A method according to claim 1, and comprising searching in a corpus of text for a match to the input string using the one or more selected analyses.

11. A method according to claim 1, and comprising checking for spelling errors in the input string using the one or more selected analyses.

12. A method for searching a corpus of text made up of words, comprising:
    morphologically analyzing the words in the corpus to generate, for each of at least some of the words, a list of candidate analyses, each candidate analysis comprising a respective lemma and a linguistic pattern relating the lemma to the analyzed word, the linguistic pattern comprising a specification of at least one characteristic of the word, selected from a set of characteristics including a part of speech, prefix, number, gender and person of the word;
    evaluating the pattern in each of the analyses so as to determine a relative frequency of occurrence of the pattern in each of the analyses, independent of the lemma to which the pattern is applied;
    selecting from the list for each of the analyzed words one or more of the analyses that comprise respective patterns whose frequency of occurrence is above a predetermined threshold;
    entering the lemmas of the selected analyses in an index of the corpus; and
    applying a search query to the index.

13. A method according to claim 12, wherein applying the search query comprises:
    receiving an input text string;
    morphologically analyzing and disambiguating the string to generate one or more search lemmas for the string; and
    comparing the search lemmas to the index.

14. A method according to claim 12, wherein the words in the corpus comprise words in a Semitic language.

15. A method according to claim 14, wherein the Semitic language comprises Hebrew.

16. A method according to claim 12, wherein selecting the at least one of the analyses comprises selecting the at least one of the analyses based on the pattern thereof, and substantially independently of the respective word.

17. A computer software product, comprising a computer-readable medium in which program instructions are stored, which instructions, when read by a computer, cause the computer to build a statistical base by morphologically analyzing a corpus of text comprising multiple words having lemmas so as to find respective linguistic patterns of the words independently of the lemmas to which the linguistic patterns are applied, each pattern comprising a specification of at least one characteristic selected from a set of characteristics including a part of speech, prefix, number, gender and person, and finding relative frequencies of occurrence of the linguistic patterns in the corpus,
    wherein the instructions further cause the computer to morphologically analyze an input string to generate a list of candidate analyses of the string, each candidate analysis comprising a respective word, having a lemma, and a linguistic pattern of the word, the linguistic pattern comprising a specification of at least one characteristic of the word, selected from a set of characteristics including a part of speech, prefix, number, gender and person of the word, and to evaluate the pattern in each of the analyses so as to determine a relative frequency of occurrence of the pattern in each of the analyses, independent of the lemma to which the pattern is applied, and to select from the list one or more of the analyses that comprise respective patterns whose frequency of occurrence is above a predetermined threshold.

18. A product according to claim 17, wherein the input string comprises a word in a Semitic language.

19. A product according to claim 18, wherein the Semitic language comprises Hebrew.

20. A product according to claim 17, wherein the instructions further cause the computer to search in a corpus of text for a match to the input string using the one or more selected analyses.

21. A computer software product, comprising a computer-readable medium in which program instructions are stored, which instructions, when read by a computer, cause the computer to morphologically analyze the words in the corpus to generate, for each of at least some of the words, a list of candidate analyses, each candidate analysis comprising a respective lemma and a linguistic pattern relating the lemma to the analyzed word, the linguistic pattern comprising a specification of at least one characteristic of the word, selected from a set of characteristics including a part of speech, prefix, number, gender and person of the word, to evaluate the pattern in each of the analyses so as to determine a relative frequency of occurrence of the pattern in each of the analyses, independent of the lemma to which the pattern is applied, to select from the list for each of the analyzed words one or more of the analyses that comprise respective patterns whose frequency of occurrence is above a predetermined threshold, to enter the lemmas of the selected analyses in an index of the corpus, and to apply a search query to the index.

22. A product according to claim 21, wherein the instructions further cause the computer to receive an input text string, to morphologically analyze and disambiguate the string to generate one or more search lemmas for the string, and to compare the search lemmas to the index.

23. Apparatus for morphological disambiguation, comprising a linguistic processor, which is adapted to build a statistical base by morphologically analyzing a corpus of text comprising multiple words having lemmas so as to find respective linguistic patterns of the words independently of the lemmas to which the linguistic patterns are applied, each pattern comprising a specification of at least one characteristic selected from a set of characteristics including a part of speech, prefix, number, gender and person, and finding relative frequencies of occurrence of the linguistic patterns in the corpus, wherein the linguistic processor is further adapted to receive an input string, to morphologically analyze the string to generate a list of candidate analyses of the string, each candidate analysis comprising a respective word, having a lemma, and a linguistic pattern of the word, the linguistic pattern comprising a specification of at least one characteristic of the word, selected from a set of characteristics including a part of speech, prefix, number, gender and person of the word, and to evaluate the pattern in each of the analyses so as to determine a relative frequency of occurrence of the pattern in each of the analyses, independent of the lemma to which the pattern is applied, and to select from the list one or more of the analyses that comprise respective patterns whose frequency of occurrence is above a predetermined threshold.

24. Apparatus according to claim 23, wherein the input string comprises a word in a Semitic language.

25. Apparatus according to claim 24, wherein the Semitic language comprises Hebrew.

26. Apparatus according to claim 23, wherein the processor is further adapted to search in a corpus of text for a match to the input string using the one or more selected analyses.

27. Apparatus for searching a corpus of text made up of words, comprising a linguistic processor, which is adapted to morphologically analyze the words in the corpus to generate, for each of at least some of the words, a list of candidate analyses, each candidate analysis comprising a respective lemma and a linguistic pattern relating the lemma to the analyzed word, the linguistic pattern comprising a specification of at least one characteristic of the word, selected from a set of characteristics including a part of speech, prefix, number, gender and person of the word, to evaluate the pattern in each of the analyses so as to determine a relative frequency of occurrence of the pattern in each of the analyses, independent of the lemma to which the pattern is applied, to select from the list for each of the analyzed words one or more of the analyses that comprise respective patterns whose frequency of occurrence is above a predetermined threshold, to enter the lemmas of the selected analyses in an index of the corpus, and to apply a search query to the index.

28. Apparatus according to claim 27, wherein the processor is further adapted to receive an input text string, to morphologically analyze and disambiguate the string to generate one or more search lemmas for the string, and to compare the search lemmas to the index.

* * * * *